(12) United States Patent
Henderson et al.

(10) Patent No.: US 6,353,666 B1
(45) Date of Patent: Mar. 5, 2002

(54) SYSTEM AND METHOD FOR PROVIDING AN ENHANCED AUDIO QUALITY TELECOMMUNICATION SESSION

(75) Inventors: P. Michael Henderson, Tustin; James W. Johnston, Rancho Santa Margarita, both of CA (US)

(73) Assignee: Conexant Systems, Inc., Newport Beach, CA (US)

(*) Notice: Subject to any disclaimer, the term of this patent is extended or adjusted under 35 U.S.C. 154(b) by 0 days.

(21) Appl. No.: 09/082,929

(22) Filed: May 21, 1998

(51) Int. Cl.[7] ............................................. H04M 7/00
(52) U.S. Cl. .................... 379/229; 379/219; 375/222
(58) Field of Search ................................ 379/219, 229, 379/410, 407, 93.31, 93.32, 93.34, 230, 406.01, 406.04; 375/222

(56) References Cited

U.S. PATENT DOCUMENTS

| | | | | |
|---|---|---|---|---|
| 5,533,121 A | * | 7/1996 | Suzuki et al. | 379/410 |
| 5,729,226 A | | 3/1998 | Betts et al. | |
| 5,801,695 A | * | 9/1998 | Townshend | 375/340 |
| 6,058,110 A | * | 9/1998 | Bellenger et al. | 379/222 |
| 6,081,556 A | * | 6/2000 | Holmquist | 375/222 |

FOREIGN PATENT DOCUMENTS

| | | |
|---|---|---|
| EP | 0058482 A1 | 8/1982 |
| WO | WO 96 19907 | 6/1996 |

OTHER PUBLICATIONS

Jayant, N.S., et al., "Coding of Wideband Speech", Speech Communication, vol. 11, No. 2/03, Jun. 1, 1992, pp. 127–138. XP000650385.

* cited by examiner

*Primary Examiner*—Stella Woo
(74) *Attorney, Agent, or Firm*—Farjami & Farjami LLP

(57) ABSTRACT

An improved telecommunication system is capable of supporting an enhanced audio transmission mode and a conventional PCM waveform encoding mode. The enhanced audio transmission mode is governed by an audio coding protocol, while the PCM mode is governed by a PCM protocol such as $\mu$-law encoding. The telecommunication system performs an in-band signaling routine during a first communication session in accordance with the PCM protocol. The in-band signaling routine employs a form of robbed bit signaling to transmit information between the calling codec and the called codec. The signaling information is utilized to determine whether the called codec is compatible with the enhanced audio coding mode and, as necessary, to initiate the transition between the PCM mode and the audio coding mode. The audio coding mode transmits signals using a wider bandwidth than that used during the PCM mode. The use of a wider bandwidth results in a higher quality sound that better resembles person-to-person speech.

23 Claims, 3 Drawing Sheets

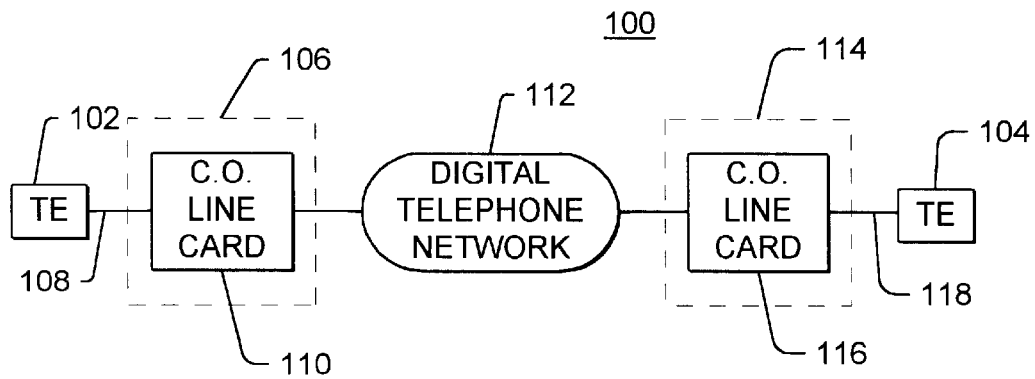
FIG. 1 - Prior Art
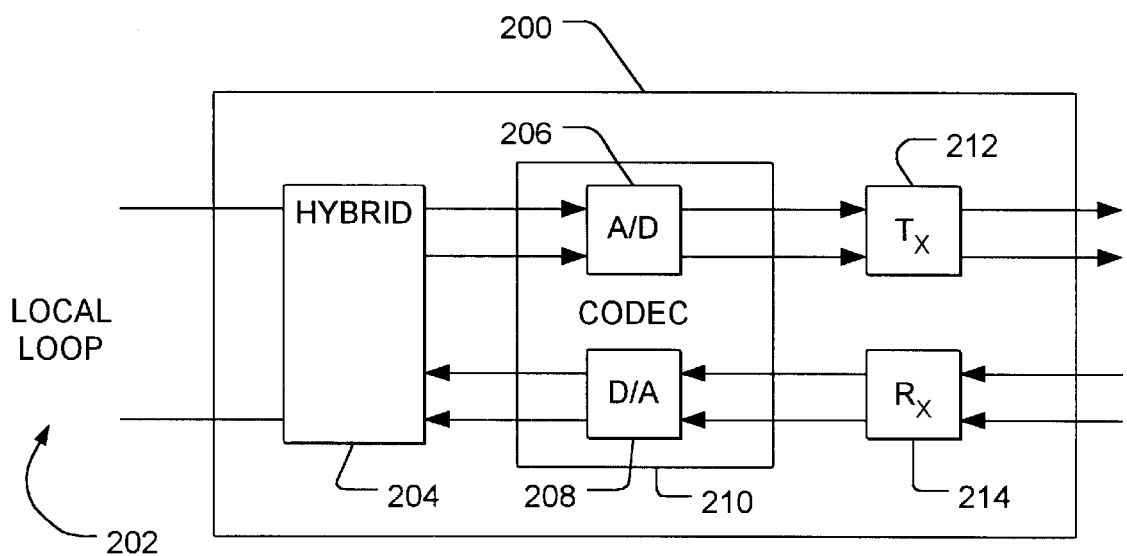
FIG. 2 - Prior Art

SYSTEM AND METHOD FOR PROVIDING AN ENHANCED AUDIO QUALITY TELECOMMUNICATION SESSION

FIELD OF THE INVENTION

The present invention relates generally to telecommunication systems that utilize digital audio/speech coders during data transmission. More particularly, the present invention relates to a telecommunication system that supports conventional waveform encoding protocols for use during relatively narrowband audio transmissions and audio coding protocols for use during relatively wideband audio transmissions over a telephone network.

BACKGROUND OF THE INVENTION

Telecommunication systems such as the public switched telephone network (PSTN) and private branch exchanges (PBXs) are generally well known. The PSTN is now considered to be a digital system that is capable of carrying data at a theoretical speed of 64 kilobits per second (kbps). FIG. 1 is a general block diagram of a conventional telecommunication system 100 showing a simple end-to-end connection between a first terminal equipment device 102 and a second terminal equipment device 104. Each of the terminal equipment devices 102 and 104 may be, e.g., a standard telephone, a personal computer having telecommunication features, or a modem device.

First device 102 is operatively coupled to a first central office 106 via a local loop connection 108. Although not shown, first central office 106 is similarly coupled to a plurality of other terminal equipment devices. First central office 106 contains a first line card 110, which may include any number of components that perform call processing, switching, transmitting, receiving, and the like. First central office 106, and first line card 110 in particular, is operatively coupled to a digital telephone network 112, e.g., a PSTN, which is configured to transmit voice calls, data, and signaling information at a theoretical speed of 64 kbps.

For the general telecommunication system 100 shown in FIG. 1, signals are transmitted through network 112 to a second central office 114 that contains a second line card 116. In accordance with conventional terminology, central offices 106 and 114 are not considered to be part of network 112. Second central office 114 is coupled to second device 104 via a local loop connection 118. First and second central offices 106 and 114 include coder/decoder (codec) elements (not shown in FIG. 1) that are configured to transmit and receive data in accordance with compatible encoding techniques.

Current telephone networks are governed by international standards; such standards require voice calls to be transmitted in accordance with well-established pulse code modulation (PCM) encoding techniques, e.g., $\mu$-law encoding in North America or A-law encoding in Europe. PCM encoding transmits codewords that represent analog voltage levels associated with an audio waveform. Due to the required PCM encoding techniques and the required 8 kHz symbol sampling rate, the audio signals transmitted during conventional telephone calls are limited to a bandwidth of about 4 kHz (in practical telecommunication systems, this bandwidth is reduced to about 3.5 kHz due to the use of filters, hybrids, and other functional elements by the system). While this narrow bandwidth may be suitable to provide clear and intelligible voice transmissions, the fidelity of such transmissions does not approach the audio quality associated with actual person-to-person transmissions.

In lieu of PCM codecs, digital voice/speech coders may be utilized by a telecommunication system to transmit audio signals in a different manner than the conventional PCM encoding techniques. Assuming that a suitable transmit bandwidth is available, such audio coders can provide enhanced fidelity voice transmissions by incorporating audio characteristics such as tone, pitch, resonance, and the like, into the transmitted signal. For example, by leveraging the 64 kbps capability of current telephone networks, wideband voice coders may be designed to provide high fidelity telephone calls in lieu of conventional audio calls that are governed by the PCM encoding protocols. Such high fidelity calls may be transmitted using a bandwidth that exceeds 4 kHz, e.g., 7 kHz or more.

Due to the current standards that govern telecommunication systems, audio coders may not be universally implemented in the many central offices associated with a given telecommunication system. Accordingly, an end-to-end high fidelity speech connection may not always be obtainable if either of the respective central office line cards do not utilize compatible audio coders. Even if both ends support high fidelity speech communications, there must be a mechanism by which the central offices can communicate to determine whether (and which) wideband audio coding protocols are supported. Currently, there is no efficient and practical signaling technique that enables such communication between two central offices.

A possible signaling technique may simply employ a substantial portion of the normal operating bandwidth to transmit tones or other signals at the beginning of a communication session. Although this procedure may effectively convey the necessary information between the central offices, the transmission of the signaling information may interfere with a call in progress and be noticeable to the end users. Accordingly, it would be desirable to employ signaling techniques that are not significantly perceptible to the end users.

Even if compatible audio coders are employed by both central offices associated with a given call, there may be situations where it is not desirable or necessary to enter the enhanced audio quality mode or where it may be desirable to switch back to conventional narrowband operation while operating in the enhanced audio mode. For example, the audio coding protocols may not be necessary in the context of modem connections that transmit data rather than audio information.

Therefore, it would be desirable to implement a telecommunication system that addresses the foregoing limitations of the prior art.

SUMMARY OF THE INVENTION

Accordingly, it is an advantage of the present invention that an improved telecommunication system that utilizes audio coders is provided.

Another advantage of the present invention is that it may be incorporated into an existing telecommunication system while maintaining backward compatibility with conventional PCM encoding protocols.

Another advantage is that the present invention provides a signaling mechanism by which two central offices associated with a telephone network can communicate to determine whether they are compatible with wideband audio coding protocols.

A further advantage is that the present invention provides a signaling procedure for use in connection with the wideband audio mode, where the signaling procedure is performed in a manner that is minimally perceptible to the end users.

The above and other advantages of the present invention may be carried out in one form by a telecommunication method for providing an enhanced audio quality communication session over a digital telephone network having first and second codecs operatively coupled thereto, where the first and second codecs are associated with first and second terminal equipment devices, respectively. The method first establishes a communication session between the first and second codecs, where the communication session is governed by a first data communication protocol under which audio transmissions are limited to a first bandwidth. Next, the method transmits, during the same communication session, an in-band signaling sequence from the first codec to the second codec to determine whether the second codec is compatible with a second data communication protocol under which audio transmissions are limited to a second bandwidth that exceeds the first bandwidth.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

FIG. 1 is a block diagram generally depicting a prior art telecommunication system in which the present invention may be implemented;

FIG. 2 is a block diagram generally showing functional components of a conventional central office line card;

DETAILED DESCRIPTION OF PREFERRED EMBODIMENTS

Figure 3:
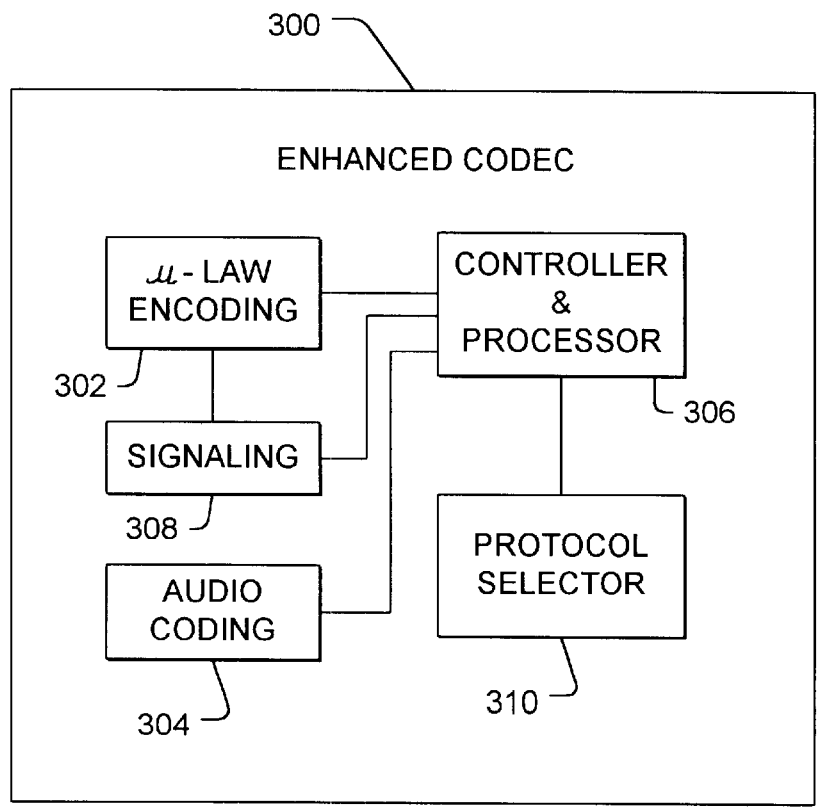
FIG. 3 is a block diagram depicting an exemplary enhanced codec that may be employed in a telecommunication system in accordance with the present invention.

The present invention may be described herein in terms of functional block components and various processing steps. It should be appreciated that such functional blocks may be realized by any number of hardware components configured to perform the specified functions. For example, the present invention may employ various integrated circuit and other components, e.g., memory elements, digital signal processing elements, look-up tables, and the like, which may carry out a variety of functions under the control of one or more microprocessors or other control devices. In addition, those skilled in the art will appreciate that the present invention may be practiced in any number of signal processing and data communication contexts and that the telecommunication systems described herein are merely exemplary applications for the invention.

As previously discussed, FIG. 1 is a general diagram of an end-to-end connection in a prior art telecommunication system 100. FIG. 2 is a block diagram of a general prior art line card 200 that may be utilized by central offices 106 or 114. As discussed above in connection with FIG. 1, line card 200 may be operatively coupled to a terminal equipment device via a local loop 202, which is configured to transmit signals to and from line card 200. Local loop 202 is shown as a two-wire system, which is consistent with most conventional telecommunication systems. Local loop 202 may be connected to a hybrid 204, which is configured to process signals for transmission over local loop 202 or digital telephone network 112, depending upon whether the signals are incoming or outgoing relative to the terminal equipment device (see FIG. 1). Hybrid 204 may be configured in accordance with any number of suitable prior art devices; particular functional details that are unrelated to the present invention are not described in detail herein.

Line card 200 may also include an analog-to-digital converter (ADC) 206 and a digital-to-analog converter (DAC) 208, which are preferably resident at a codec 210. ADC 206 is suitably configured to convert analog signals from local loop 202 into digital signals for further processing by line card 200 and for subsequent transmission through digital telephone network 112. DAC 208 performs the reverse operation to transform digital signals into analog signals suitable for transmission over local loop 202.

As mentioned above, ADC 206 and DAC 208 may each be contained in codec 210, which performs data encoding and decoding in accordance with the particular operating protocol associated with telecommunication system 100. In the context of this description, codec 210 may be configured to perform PCM encoding and decoding in accordance with the $\mu$-law or A-law schemes (as set forth in ITU-T Recommendation G.711). Alternatively, codec 210 may be configured to perform audio or speech coding in accordance with known specifications such as ITU-T Recommendation G.722 (International Telecommunication Union, 1993). The G.722 Recommendation sets forth an audio coding technique for the transmission of an audio signal having 7 kHz of bandwidth using 64 kbps. In the context of this invention, codec 210 may utilize any suitable operating technique to suitably carry out the audio coding.

Regardless of the specific specification followed by codec 210, line card 200 includes a transmitter 212 and a receiver 214 respectively configured to transmit and receive digital signals to and from digital telephone network 112. Transmitter 212 and receiver 214 may be suitably designed for compatibility with the particular data transmission protocols utilized by telephone network 112. The transmitters and receivers resident at the respective line cards 110 and 116 (see FIG. 1) may operate in conjunction with the respective codecs to suitably establish communication sessions between the codecs. Such communication sessions may be governed by any number of data transmission, signaling, and other operating protocols.

Referring now to FIG. 3, an exemplary enhanced codec 300 in accordance with the present invention is illustrated in block diagram form. Codec 300 may be employed in lieu of, or in addition to, the general codec 210 described above. Codec 300 is preferably configured to support a conventional PCM encoding protocol 302, e.g., in accordance with $\mu$-law or A-law encoding, and an audio coding protocol 304, e.g., in accordance with Recommendation G.722. It should be appreciated that the functional blocks depicted in FIG. 3 may be suitably implemented in the form of any number of software applications and may be carried out by a controller/processor 306 and conventional memory elements (not shown).

Codec 300 may also include (or be operatively associated with) a signaling feature 308 configured to execute an in-band signaling routine in accordance with the present invention. The in-band signaling routine, which is described more fully below, may transmit a signaling sequence between a first codec resident at line card 110 and a second codec resident at line card 116. In the preferred embodiment, the in-band signaling sequence is transmitted during a first communication session governed by the $\mu$-law encoding protocol and the signaling sequence is utilized to determine whether the second codec is compatible with the audio coding protocol supported by the first codec. Codec 300 may be associated with a protocol selector/switch 310 that functions to switch the operation of codec 300 from one functional protocol to another in response to the in-band signaling routine. It should be noted that telecommunication system 100 need not employ enhanced codecs 300 at every central office; indeed, the present invention contemplates mixed applications and downward compatibility.

As discussed briefly above, audio transmissions governed by conventional PCM encoding protocols are limited to a relatively narrow bandwidth, e.g., less than approximately 3.5 kHz in a practical telecommunication system. In contrast, audio transmissions governed by audio or voice coding protocols may be limited to a relatively wide bandwidth that exceeds the transmission bandwidth associated with PCM protocols. For example, Recommendation G.722 sets forth an audio coding protocol for transmissions with a bandwidth of approximately 7.0 kHz. The use of wider bandwidth during audio transmissions results in an enhanced quality audio sound that is immediately perceptible by the end users.

Figure 4:
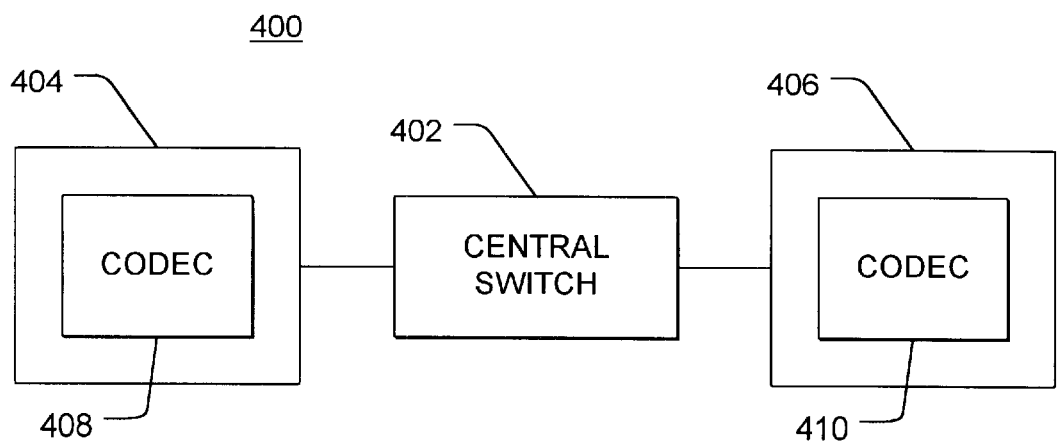
FIG. 4 is a block diagram generally depicting a PBX system in which the present invention may be implemented.

The principles of the present invention are not limited to those applications involving public telephone systems. For example, an alternate embodiment of the present invention may be implemented in the context of a PBX system. For purposes of this description, a "PBX" system may refer to a private automated branch exchange (PABX), a computerized branch exchange (CBX), a digital branch exchange (DBX), an integrated branch exchange (IBX), or the like. FIG. 4 is a block diagram showing a general PBX system 400 that may be configured in accordance with the present invention. PBX system 400 generally includes a central switching component 402 that performs call processing and switching between a plurality of terminal equipment devices, e.g., first and second terminal equipment devices 404 and 406. These basic components of PBX system 400, and the general operational features of PBX system 400, may be in accordance with any number of prior art PBX systems.

First and second codecs 408 and 410 may be resident at first and second terminal equipment devices 404 and 406, respectively. Instead of codecs 408 and 410, PBX system 400 may include any number of processing components that perform equivalent or similar functions. Codecs 408 and 410 may be configured in accordance with conventional techniques such that they are compatible with the normal operating protocols followed by prior art PBX systems. In the context of the present invention, however, at least one of codecs 408 and 410 is configured with the enhanced capabilities described above in connection with FIG. 3. In other words, codecs 408 and 410 may be configured to support both conventional "low-fidelity" audio transmissions and "high-fidelity" audio transmissions that are governed by audio or voice coding protocols. Further, one or both of codecs 408 and 410 may be configured to support the in-band signaling routine described herein.

It should be noted that the functionality described in connection with enhanced codec 300 may be implemented within any suitable component of a general telecommunication system. For example, although FIG. 4 shows codecs 408 and 410 resident at terminal equipment devices 404 and 406, a practical PBX system (or telecommunication system 100 in a similar manner) may utilize equivalent functional components located at central switch 402 or at intermediate stations (not shown) located between central switch 402 and terminal equipment devices 404 and 406. Due to the centralized nature of PBX systems, the principles of the present invention may be readily implemented in existing PBX systems to facilitate enhanced quality audio transmissions for internal calls even if the outside central office does not support the enhanced mode.

Figure 5:
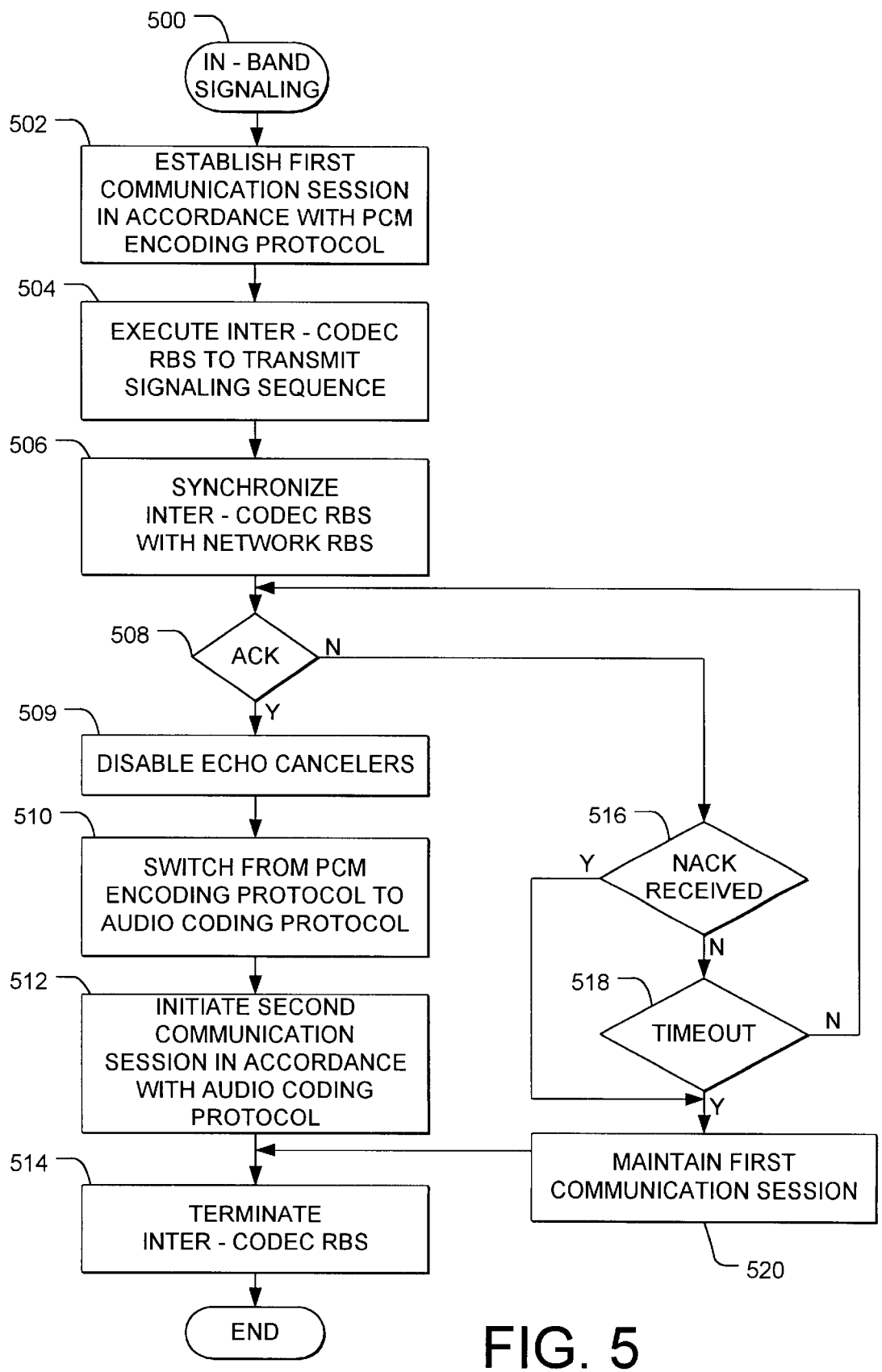
FIG. 5 is a flow diagram of an exemplary signaling method that may be carried out by a telecommunication system operating in accordance with the present invention.

As described above, an in-band signaling routine may be employed by telecommunication system 100 (or PBX system 400) to enable compatible terminal equipment devices to communicate in the enhanced wideband transmission mode. The signaling routine may allow a calling central office to identify to a called central office that the calling central office supports the enhanced mode. In addition, the signaling routine may allow the calling central office to interrogate the called central office to determine whether the called central office is also compatible with the enhanced mode. FIG. 5 is a flow diagram of an exemplary in-band signaling process 500 that may be performed by telecommunication system 100 to accomplish these and other goals. Although process 500 is described in conjunction with telecommunication system 100, process 500 may be equivalently applied to PBX system 400.

In-band signaling process 500 is preferably performed in response to the placement of a call by a calling party at, e.g., first terminal equipment device 102. For the sake of brevity and clarity, conventional call initiation and switching procedures are not described in detail herein. Those skilled in the art will recognize that telecommunication system 100 may utilize any number of known techniques to produce a dial tone in response to an off-hook condition at first terminal equipment device 102 and process the data (e.g., the called party telephone number) provided by the user at device 102.

Process 500 may begin with a task 502, which establishes a first communication session between a first codec (not shown in FIG. 1) located at first central office 106 and a second codec (not shown in FIG. 1) located at a second central office 114. In a practical system, task 502 may be performed by the codecs and/or any number of processing components located at the central offices or the central office line cards. For purposes of this description, the first communication session is established when a data channel is formed between central offices 106 and 114. For example, a conventional call set-up routine performed in response to a call placed by a user at first central office 106 may be implemented during task 502 to establish the communication session. It should be noted that the first communication session may be established prior to an off-hook condition at second terminal equipment device 104 and prior to the receipt of a return ring signal at first terminal equipment device 102. In accordance with the present invention, the first communication session is governed by a first data communication protocol, e.g., in accordance with standard $\mu$-law or A-law PCM encoding techniques. In other words, the data transmitted through digital telephone network 112 (between central offices 106 and 114) is encoded and decoded, formatted, and otherwise processed in accordance with predetermined requirements.

Such governing operating protocols are utilized to ensure that any two central offices 106 and 114 are compatible with one another. The $\mu$-law and A-law protocols employ PCM techniques to encode an analog waveform (e.g., the audio signal generated by a terminal equipment device) into a plurality of multiple-bit samples that are transmitted over telephone network 112 during the communication session. In accordance with recognized international standards, μ-law codewords are contained in 8-bit samples that are transmitted through telephone network 112 at a rate of 8000 samples per second to obtain a bit rate of 64 kbps. As discussed briefly above, PCM encoding techniques may be adequate for purposes of transmitting a digital representation of whatever analog voltage is present on the transmitting local loop. However, because audio transmissions governed by the same PCM encoding techniques are limited to a relatively narrow bandwidth, these techniques may not be optimally configured to accurately represent voice or speech signals.

After task 502 establishes the first communication session, a task 504 may be performed to execute a suitable in-band signaling routine to determine whether the called codec is compatible with a second data communication protocol different than the protocol governing the first communication session, e.g., an audio coding protocol. For purposes of this description, in-band signaling occurs over the same communication channel that conveys the encoded voice signals, in contrast to out-of-band signaling that utilizes a separate communication channel to convey the signaling data. Consequently, the end users can converse in a normal manner while the in-band signaling occurs. In accordance with one aspect of the present invention, a signaling sequence is transmitted from the codec associated with the calling terminal equipment device to the codec associated with the called terminal equipment device. In a practical system, it is desirable to keep this signaling sequence relatively short such that the transition between operating modes can be performed quickly and in a manner that is virtually undetectable by the users. Accordingly, in the preferred embodiment, task 504 is performed such that the audio quality associated with the first communication session is not substantially affected by the in-band signaling sequence.

In an exemplary embodiment, the signaling sequence is formatted as a sequence of about 100 bits, where the particular sequence is configured such that it can be easily detected by the called codec. Because the signaling sequence is transmitted as an in-band signal, it is preferably formatted to be distinct relative to "normal" or "ordinary" bit sequences that are likely to appear during normal operation associated with data representing encoded audio. The specific characteristics of the signaling sequence, the amount of signaling information contained therein, and how the two codecs (or other suitable components associated with the terminal equipment devices) receive and process the signaling sequence may vary from application to application. For example, the signaling sequence may be suitably formatted to identify to the called codec that the calling codec is compatible with an audio coding protocol. Of course, any number of sub-sequences or different interrogation signals may be transmitted during the in-band signaling routine.

An exemplary practical implementation of the present invention utilizes inter-codec robbed bit signaling (RBS) to convey the signaling sequence described above. In the context of this description, "inter-codec RBS" refers to an RBS technique that occurs between two codecs resident in a telecommunication system. Of course, in the context of alternate embodiments, "inter-codec RBS" may refer to RBS techniques that occur between central offices, line cards, terminal equipment devices, or other suitable processing components. It should be noted that inter-codec RBS is different than "network RBS" (which is often simply referred to as RBS in the telephony field). Network RBS may be introduced by telecommunication system 112 itself to facilitate internal control signaling with respect to the network links and other functional elements of telecommunication system 112. Conventional network RBS periodically replaces the least significant bit of the 8-bit samples transmitted over telephone network 112 with digital signaling information. Network RBS is not utilized outside of telephone network 112.

Like conventional network RBS, the inter-codec RBS utilized during task 504 is designed to operate during the first communication session, during which 8-bit samples are transmitted between the central offices. The inter-codec RBS procedure preferably utilizes the least significant bit in each of a number of the 8-bit samples to convey the signaling sequence from the calling codec to the called codec. Similarly, the inter-codec RBS procedure may be suitably employed in the reverse direction to transmit signaling information from the called codec to the calling codec.

The use of the least significant bits to convey the in-band signaling sequence is desirable to minimize the adverse affect on the audio quality associated with the communication session. Nevertheless, the inter-codec RBS need not be restricted to the least significant bit positions. Indeed, the voice quality associated with the first communication session may be acceptable even if the inter-codec RBS is applied to the second least significant bit positions. Regardless of the specific form of inter-codec RBS implemented, any undesirable effects will be temporary due to the relatively short duration of the in-band signaling routine.

During the in-band signaling routine, a task 506 may be performed to synchronize the inter-codec RBS relative to any network RBS that may be introduced during the current communication session. Task 506 may be performed by controller/processors 306 (see FIG. 3) resident at the respective calling and called codecs and task 506 may utilize information obtained during an initialization routine that determines the presence of network RBS and the timing phase associated with the network RBS. Task 506 may be desirable to ensure that the inter-codec RBS routine does not apply to those samples that are already affected by network RBS. Thus, the synchronization technique performed during task 506 may enable telecommunication system 100 to determine a suitable period with which inter-codec RBS is periodically employed. In a similar manner, in-band signaling process 500 may be configured to compensate for other digital impairments, e.g., digital pads, that may also affect the in-band signaling sequence.

As mentioned above, the in-band signaling sequence is preferably formatted to identify to the called codec that the calling codec supports the enhanced audio coding mode. Accordingly, process 500 may include a query task 508, that tests whether an acknowledgment (ACK) signal has been received at the calling central office. For purposes of this description, this ACK message signifies that the called central office is also compatible with the enhanced audio coding mode. Such an ACK signal or message may be transmitted by the called central office in response to the in-band signaling sequence. In accordance with the present invention, the ACK signal is also conveyed using the inter-codec RBS routine. The particular format of the ACK signal and the manner with which it is transmitted and received may vary depending upon the specific telecommunication system.

If query task 508 determines that an ACK message has been received, then a task 509 may be performed to suitably disable the network echo cancelers. It may be necessary to disable the conventional echo cancelers employed by the codecs during the first communication session to ensure that the audio coding technique can be implemented. Accordingly, the in-band signaling routine may also be utilized to instruct the codecs to suitably disable or modify the echo cancelers when the protocols are switched. This disabling is preferably performed while reception by the users is blocked such that the disabling is not detected by the users. Following task 509, a task 510 is preferably performed to cause the respective codecs to switch from operating under the initial data communication protocol, e.g., a PCM waveform encoding protocol, to operating under the second data communication protocol, e.g., a voice coding protocol.

As described above, audio transmissions governed by the second protocol are limited to a relatively wider bandwidth that exceeds the operating bandwidth associated with the PCM encoding protocol used during the first communication session. Although the protocol set forth in Recommendation G.722 may be applicable in this context, the present invention is not limited to any specific audio coding techniques. The calling and called codecs may implement a number of conventional timing and synchronization procedures to ensure that task 510 is performed by both codecs in a substantially predictable manner. Such timing and synchronization procedures may be desirable to facilitate a smooth and virtually undetectable transition between the two operating protocols. Furthermore, the second protocol may implement a suitably compatible wideband echo cancellation technique for use during a second communication session.

A task 512 is preferably performed to initiate the second communication session in accordance with the audio coding protocol set forth in task 510. During this second communication session, the audio signals may be considered to be "enhanced" or "high fidelity" relative to the first communication session. It should be understood that in-band signaling process 500 is configured such that tasks 510 and 512 are performed when the called codec is compatible with the second protocol. As described in more detail below, if the called codec does not support the enhanced mode, then the second communication session will not be initiated.

Following task 512, a task 514 may be performed to suitably terminate the in-band signaling routine in response to the protocol switching and/or in response to the initiation of the second communication session. Task 514 may be required to ensure compatibility with the second data communication protocol, which may not format or transmit the digital data in the same manner as the first protocol. For example, one exemplary audio coding protocol that may be used in the context of the present invention calls for the transmission of a digital bit stream rather than a series of multiple-bit samples. Accordingly, inter-codec RBS may not be applicable to transmissions governed by this exemplary audio coding protocol and the misapplication of inter-codec RBS may cause transmission errors.

Although not shown in FIG. 5, process 500 may include any number of additional tasks designed to ensure that the calling and called codecs and central offices are adequately reconfigured to support the second communication session. It should be appreciated that any number of conventional features or components may be subject to switching, disabling, enabling, modifying, conditioning, or other processing tasks such that the second communication session operates in an efficient and robust manner.

Following task 514, in-band signaling process 500 ends with telecommunication system 100 operating in the wideband audio mode. During the second communication session governed by the exemplary audio coding protocol described above, digital data streams are transmitted between the calling and called codecs. The digital data streams contain information associated with the coded audio signals; these coded audio signals are eventually decoded for suitable analog transmission over the respective local loops 108 and 118 (see FIG. 1).

Referring back to query task 508, if an ACK message or signal is not received by the calling codec, then a query task 516 may be performed to determine whether a negative acknowledgment (NACK) signal or message has been received by the calling codec. The NACK message may be configured to inform the calling codec that the called codec does not support the audio coding protocol. The NACK message may also be used to inform the calling codec that the called codec determined not to support the audio coding protocol, even if the compatibility exists. Such a decision may be made in response to, e.g., a high error rate that causes a lower effective bandwidth, intermediate processing or uncorrectable impairments within the current communication channel, or the like. If query task 516 determines that a NACK message is not received, then a query task 518 may be performed. Query task 518 tests whether a timeout interval has elapsed.

The timeout period may be of any suitable length and may be implemented to prevent the in-band signaling routine from idling without committing to a particular data communication protocol. If the timeout interval has not elapsed, then in-band signaling process 500 may be reentered at query task 508 to continue testing for the presence of an ACK or a NACK message. As an optional step (not shown), process 500 may retransmit the signaling sequence (or a portion thereof) to the called codec during the timeout period. Such redundant transmission of the signaling sequence may be desirable to increase the likelihood that the called codec receives the signaling information.

If query task 518 determines that the timeout period has elapsed without the calling codec receiving an ACK message or a NACK message, then a task 520 is preferably performed. Task 520 may also be performed if the calling codec receives a NACK message from the called codec (see query task 516). Task 520 is performed to maintain the first communication session when the called codec is incompatible with the audio coding protocol or when the called codec fails to respond to the signaling sequence transmitted by the calling codec. Following task 520, process 500 may be reentered at task 514 to suitably terminate the in-band signaling technique. Consequently, in response to task 520, telecommunication system 100 preferably operates in a conventional manner governed by the standard PCM encoding protocol.

In summary, the present invention provides an improved telecommunication system that utilizes audio coders in a flexible manner depending upon the compatibility of the codecs associated with the calling and called parties. The techniques of the present invention may be incorporated into an existing telecommunication system while maintaining backward compatibility with conventional PCM encoding protocols. In accordance with one aspect of the present invention, a signaling procedure is provided to enable communication between two codecs; the signaling allows the codecs to determine whether a wideband audio coding protocol can be followed. In addition, the signaling procedure is performed in a manner that is minimally perceptible to the end users.

The present invention has been described above with reference to preferred embodiments. However, those skilled in the art will recognize that changes and modifications may be made to the preferred embodiments without departing from the scope of the present invention. For example, the specific functional components that carry out the various processing tasks may vary from system to system. In addition, the specific processes and tasks associated with the present invention may be performed in a different order and manner than that described herein. These and other changes or modifications are intended to be included within the scope of the present invention, as expressed in the following claims.

What is claimed is:

1. A telecommunication method for providing an enhanced audio quality communication session over a digital telephone network having first and second central offices operatively coupled to said digital telephone network and first and second codecs resident at said first and second central offices, respectively, said method comprising the steps of:

establishing a communication session in accordance with $\mu$-law or A-law waveform encoding techniques between said first and second codecs, said communication session being governed by a first data communication protocol, wherein audio transmissions governed by said first data communication protocol are limited to a first bandwidth;

executing, during said communication session, an in-band signaling routine between said first and second codecs to determine whether said second codec is compatible with a second data communication protocol, wherein audio transmissions governed by said second data communication protocol are limited to a second bandwidth that exceeds said first bandwidth; and switching from said first data communication protocol to said second data communication protocol in response to said executing step; and initiating a second communication session in accordance with audio coding techniques.

2. A method according to claim 1, wherein said executing step comprises the step of transmitting a signaling sequence from said first codec to said second codec.

3. A method according to claim 2, wherein said signaling sequence is configured to identify to said second codec that said first codec is compatible with said second protocol.

4. A method according to claim 1, wherein said in-band signaling routine employs inter-codec robbed bit signaling.

5. A method according to claim 4, wherein:

said digital telephone network utilizes network robbed bit signaling; and said method further comprises the step of synchronizing said inter-codec robbed bit signaling relative to said network robbed bit signaling.

6. A method according to claim 1, wherein:

said establishing step establishes said communication session in accordance with $\mu$-law waveform encoding techniques such that a plurality of multiple-bit samples are transmitted during said communication session; and said in-band signaling routine utilizes the least significant bit in each of a number of said multiple-bit samples to convey a signaling sequence to said second codec.

7. A method according to claim 1, further comprising the step of transmitting an acknowledgment from said second codec to said first codec when said second codec is compatible with said second protocol, said transmitting step being performed during said communication session.

8. A method according to claim 1, further comprising the step of terminating said in-band signaling routine, said terminating step being performed in response to said switching step.

9. A telecommunication method for providing an enhanced audio quality communication session over a digital telephone network having first and second codecs operatively coupled thereto, said first and second codecs being associated with first and second terminal equipment devices, respectively, said method comprising the steps of:

establishing a communication session in accordance with $\mu$-law or A-law waveform encoding techniques between said first and second codecs, said communication session being governed by a first data communication protocol under which audio transmissions are limited to a first bandwidth; and transmitting, during said communication session, an in-band signaling sequence from said first codec to said second codec to determine whether said second codec is compatible with a second data communication protocol under which audio transmissions are limited to a second bandwidth that exceeds said first bandwidth, and initiating a second communication session in accordance with audio coding techniques, said initiating step being performed when said second codec is compatible with said second data communication protocol.

10. A method according to claim 9, wherein said transmitting step employs inter-codec robbed bit signaling to transmit said in-band signaling sequence.

11. A method according to claim 9, wherein:

said establishing step establishes said communication session in accordance with $\mu$-law waveform encoding techniques such that a plurality of multiple-bit samples are transmitted during said communication session; and said transmitting step utilizes the least significant bit in each of a number of said multiple-bit samples to convey said signaling sequence to said second codec.

12. A method according to claim 9, wherein said transmitting step is performed such that the audio quality associated with said communication session is not substantially affected by said in-band signaling sequence.

13. A telecommunication system comprising:

a digital telephone network;

a first codec operatively coupled to said digital telephone network, said first codec being associated with a first terminal equipment device;

a second codec operatively coupled to said digital telephone network, said second codec being associated with a second terminal equipment device;

means for establishing a communication session between said first and second codecs, said communication session being governed by a first data communication protocol employing a $\mu$-law or A-law waveform encoding technique, wherein audio transmissions governed by said first data communication protocol are limited to a first bandwidth; and means for executing an in-band signaling routine between said first and second codecs to determine whether said second codec is compatible with a second data communication protocol, said in-band signaling routine occurring during said communication session, wherein audio transmissions governed by said second data communication protocol are limited to a second bandwidth that exceeds said first bandwidth; and means for initiating a second communication session in accordance with audio coding techniques, said initiating step being performed when said second codec is compatible with said second data communication protocol.

14. A telecommunication system according to claim 13, wherein said means for executing is configured to transmit a signaling sequence from said first codec to said second codec during said in-band signaling routine.

15. A telecommunication system according to claim 14, wherein said signaling sequence is configured to identify to said second codec that said first codec is compatible with said second protocol.

16. A telecommunication system according to claim 13, wherein said in-band signaling routine employs inter-codec robbed bit signaling.

17. A telecommunication system according to claim 16, wherein:

said digital telephone network utilizes network robbed bit signaling; and said telecommunication system further comprises means for synchronizing said inter-codec robbed bit signaling relative to said network robbed bit signaling.

18. A telecommunication system according to claim 13, wherein:

said means for establishing establishes said communication session in accordance with $\mu$-law waveform encoding techniques such that a plurality of multiple-bit samples are transmitted during said communication session; and said in-band signaling routine utilizes the least significant bit in each of a number of said multiple-bit samples to convey a signaling sequence to said second codec.

19. A telecommunication method for providing an enhanced audio quality communication session over a digital public branch exchange (PBX) having a central switching component, first and second terminal equipment devices operatively coupled to said central switching component, and first and second codecs resident at said first and second terminal equipment devices, respectively, said method comprising the steps of:

establishing a communication session in accordance with $\mu$-law waveform encoding techniques between said first and second codecs, said communication session being governed by a first data communication protocol under which audio transmissions are limited to a first bandwidth;

executing, during said communication session, an in-band signaling routine between said first and second codecs to determine whether said second codec is compatible with a second data communication protocol under which audio transmissions are limited to a second bandwidth that exceeds said first bandwidth;

switching from said first data communication protocol to said second data communication protocol when said second codec is compatible with said second data communication protocol, wherein said second data communication protocol utilizes audio coding techniques; and maintaining said communication session when said second codec is incompatible with said second data communication protocol.

20. A method according to claim 19, wherein said executing step comprises the step of transmitting a signaling sequence from said first codec to said second codec.

21. A method according to claim 19, wherein said in-band signaling routine employs inter-codec robbed bit signaling.

22. A method according to claim 19, wherein:

said establishing step establishes said communication session in accordance with $\mu$-law waveform encoding techniques such that a plurality of multiple-bit samples are transmitted during said communication session; and said in-band signaling routine utilizes the least significant bit in each of a number of said multiple-bit samples to convey a signaling sequence to said second codec.

23. A method according to claim 19, further comprising the step of terminating said in-band signaling routine, said terminating step being performed in response to said switching step.

* * * * *